(12) United States Patent
Spitz et al.

(10) Patent No.: US 7,199,987 B2
(45) Date of Patent: Apr. 3, 2007

(54) DIODE SYSTEM HAVING ZENER DIODES AND A GENERATOR

(75) Inventors: Richard Spitz, Reutlingen (DE);
Rainer Topp, Reutlingen (DE); Alfred Goerlach, Kusterdingen (DE); Holger Haussmann, Metzinger (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 10/474,966

(22) PCT Filed: Apr. 13, 2002

(86) PCT No.: PCT/DE02/01387

§ 371 (c)(1),
(2), (4) Date: Jun. 7, 2004

(87) PCT Pub. No.: WO02/084840

PCT Pub. Date: Oct. 24, 2002

(65) Prior Publication Data

US 2004/0212354 A1    Oct. 28, 2004

(30) Foreign Application Priority Data

Apr. 17, 2001 (DE) .............................. 101 18 846

(51) Int. Cl.
*H02H 7/00* (2006.01)

(52) U.S. Cl. ...................................................... 361/21

(58) Field of Classification Search .................. 361/6, 361/21, 33, 56, 86; 322/28
See application file for complete search history.

(56) References Cited

U.S. PATENT DOCUMENTS

| 4,143,313 | A | * | 3/1979 | Arendt ......................... 322/28 |
| 4,985,670 | A | * | 1/1991 | Kaneyuki et al. ............. 322/28 |
| 5,606,246 | A | * | 2/1997 | Adachi ........................... 322/8 |
| 5,617,011 | A | * | 4/1997 | Hammer et al. ............... 322/28 |
| 5,719,488 | A | * | 2/1998 | Mashino et al. ............... 322/28 |

FOREIGN PATENT DOCUMENTS

| DE | 694 06 703 | 12/1997 |
| JP | 04088843 A | * 3/1992 |
| JP | 04 088 843 | 7/1992 |

OTHER PUBLICATIONS

Patent Abstract of Japan, vol. 016, No. 316 (E-1231), Jul. 10, 1992 &, JP 04 088843 A (Hitachi Ltd), Mar. 23, 1992.

* cited by examiner

*Primary Examiner*—Stephen W. Jackson
(74) *Attorney, Agent, or Firm*—Kenyon & Kenyon LLP

(57) ABSTRACT

A diode system and a generator, uses Zener diodes. The diode system has AC voltage terminals and DC voltage terminals, in which the Zener diodes are operable in the forward direction to rectify an AC voltage present at the AC voltage terminals, in which a lower limit is provided for the Zener voltage of the Zener diodes, and in which the lower limit of the Zener voltage is provided so that it is lower than a preset lower DC voltage.

6 Claims, 1 Drawing Sheet

DIODE SYSTEM HAVING ZENER DIODES AND A GENERATOR

FIELD OF INVENTION

The present invention relates to a diode system having Zener diodes and a generator.

BACKGROUND INFORMATION

Three-phase claw-pole generators having a passive rectifier bridge may be used to generate power in 14 V vehicle electrical systems. In the case of a load dump (a sudden drop in load), which is produced for example by quickly cutting off a high load current, a high free-running voltage occurs at the generator output, due to a delayed response on the part of the generator output voltage regulator. To avoid overvoltage damage in vehicle electrical systems, this overvoltage must be limited. Zener diodes may be used for this purpose in general rectifiers, which may be an economical approach to this problem. The rectifier diodes, i.e., Zener diodes, are used during normal operation to rectify the alternating phase voltage produced by the generator. In this case, the Zener diodes are operated in the forward direction and have a current flowing from the anode to the cathode.

In 14 V vehicle electrical systems, the rectifier Zener diodes meet certain tolerance conditions, the maximum voltage tolerated by the electrical system from the generator, in extreme cases, being double the normal electrical system voltage or even higher. These ratios may not be easily transferable to vehicle electrical systems having higher supply voltages because doubling this high supply voltage would result in such a high voltage that further protective measures would be required.

SUMMARY OF THE INVENTION

The diode system according to the present invention and the generator according to the present invention provide an overload protection for the vehicle electrical system even in the event of an elevated supply voltage for a DC system, economically obtainable Zener diodes being used as the rectifier diodes.

DETAILED DESCRIPTION

Figure 1:
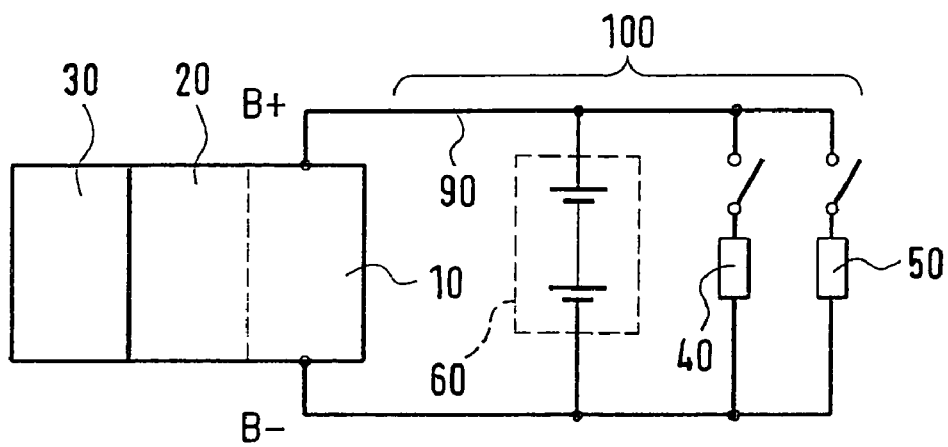
FIG. 1 shows a generator having a rectifier and a connected DC system.

FIG. 1 shows a generator 20 having a rectifier system 10. It also illustrates a controller 30 for generator 20, which is connected to generator 20. Rectifier system 10 is connected to generator 20 so that the outputs of generator 20 (not illustrated in FIG. 1) carrying the AC voltage supplied by generator 20 correspond to the AC voltage terminals (also not illustrated in FIG. 1) of rectifier system 10. Rectifier system 10 includes two DC voltage terminals, a first DC voltage terminal B+ and a second DC voltage terminal B−, which are connected to a DC system 100. Rectifier system 10 may additionally include capacitors for smoothing the rectified voltage at DC voltage outputs B+ and B−, capacitors of this type, however, not being illustrated. DC system 100 includes a connection 90 between first DC voltage terminal B+ and DC system 100. Connection 90 establishes a connection to the rest of DC system 100. DC system 100 also includes a battery 60 and usually a first load 40 and a second load 50, which may be connected to DC system 100 as well as disconnected therefrom, activated and deactivated by switches that are illustrated, but not identified in further detail.

According to the exemplary embodiment of the present invention, DC system 100 is provided, in particular, in the form of a vehicle electrical system. As a result, the terms vehicle electrical system 100 and DC system 100 are used interchangeably below.

Figure 2:
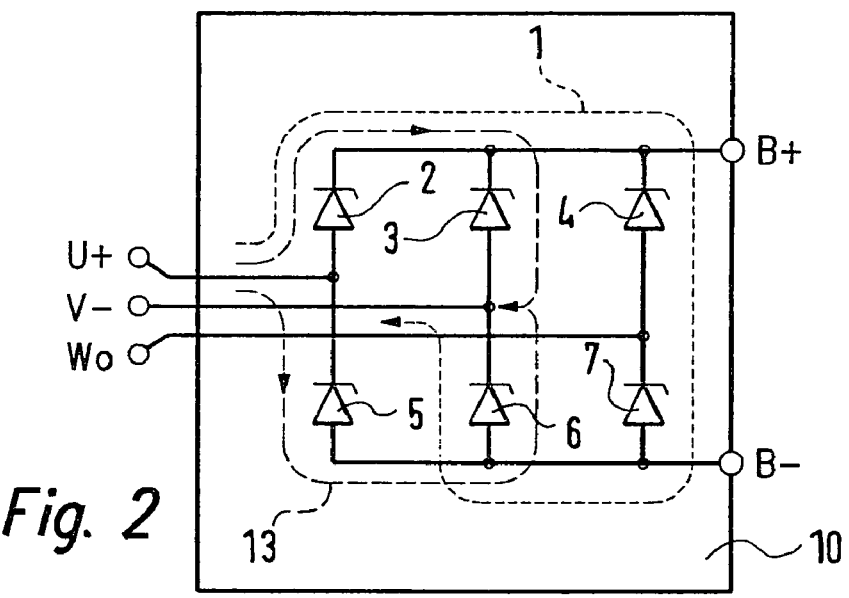
FIG. 2 shows a rectifier system according to the present invention.

FIG. 2 shows an enlarged representation of a rectifier system 10 according to FIG. 1. Rectifier system 10 includes a number of diodes, which is why rectifier system 10 according to the present invention is also referred to as diode system 10. Diode system 10 includes a first diode 2, a second diode 3, a third diode 4, a fourth diode 5, a fifth diode 6, and a sixth diode 7. Diodes 2–7 are provided according to the present invention in the form of Zener diodes and form a rectifier bridge of a conventional design. FIG. 2 shows AC terminals on the left side of diode system 10. The latter include a first AC voltage terminal U, a second AC voltage terminal V, and a third AC voltage terminal W. On the right side of rectifier system 10, FIG. 2 shows DC terminals B+, B− of diode system 10.

During normal operation, i.e., when rectifying the AC phase voltage present at the AC voltage inputs, i.e., AC voltage terminals U, V, W, diodes 2–7 are operated in the forward direction and have a current flowing from the anode to the cathode. This is shown in FIG. 2 by broken line 1 made up of short dashes. When rectifying a positive half-wave of the AC voltage between AC voltage terminals U and V, the current path first leads from first AC voltage terminal U to first diode 2, which is activated in the forward direction; then it leads via first DC terminal B− and vehicle electrical system 100 to second DC terminal B−, from where it passes on to second AC voltage terminal V via fifth diode 6. Both first diode 2 and fifth diode 6 are operated in the forward direction.

If a load dump occurs, the AC phase voltage increases and is limited for the diode combination situated between the phase terminals, i.e., AC terminals U, V, W. Diodes 2–7 are operated at least partially in their Zener breakdown, i.e., in the reverse direction. In this case, the limiting voltage is determined primarily by the Zener voltage of diodes 2–7 that are operated in the reverse direction. The phase limiting voltage is derived from the sum of a diode forward voltage and a diode Zener voltage. A load dump situation of this type uses a current path that is illustrated in FIG. 2 by broken current path line 13 made up of longer dashes. Current path 13 leads from first AC voltage terminal U via first diode 2 (in the forward direction) and second diode 3 (operated in the reverse direction) to second AC voltage terminal V as well as via fourth diode 5 (operated in the reverse direction) and fifth diode 6 (operated in the forward direction), also to second AC voltage terminal V. In this case, the vehicle system limiting voltage derived from the difference between the diode Zener voltage and the diode forward voltage is present at DC voltage terminals B+, B−. Because the diode Zener voltage is much higher than the diode forward voltage, the load dump limiting voltage present at DC terminals B+, B− is ultimately determined primarily by the breakdown voltage, i.e., the Zener voltage of Zener diodes 2–7. This, in turn, results from the manufacturing tolerance of the Zener voltage of Zener diodes 2–7, which is specified under standardized conditions at low current and room temperature, and also from other components that are determined by the Zener diode operating situation, for example from the reverse current, the junction temperature of the diode and similar factors. On the whole, this yields a tolerance zone for the load dump limiting voltage, which is determined by the manufacturing tolerances and operating conditions (currents, junction temperatures) of the diodes. The junction temperature, in turn, is dependent on the external operating temperature, the internal power loss and the thermal cooling of the diodes in each application. In order to use the rectifier Zener diodes to effectively limit the load dump voltage, they must be designed to ensure that their Zener voltage does not exceed or drop below preset tolerance ranges in all operating areas determined by the application or by other requirements such as standards and safety regulations.

According to the exemplary embodiment of the present invention, rectifier Zener diodes 2–7 may also be used for vehicle electrical systems 100 that have a much higher setpoint voltage than, for example, the 14 V setpoint voltage of conventional vehicle electrical systems 100. To achieve this, the breakdown voltage tolerances must be lowered. Under extreme conditions, however, the Zener diode is temporarily operated in the Zener breakdown even during normal operation (i.e., without load dumping) of generator 20 and rectifier 10, while—according to the exemplary embodiment of the present invention—the maximum load dump voltage at generator output B+, B− may rise to a value that is higher than the permissible voltage in entire vehicle electrical system 100 in the event of a complete load dump, for example, the interruption of connection 90. In this case, all generator components must be configured or selected for this elevated voltage, while this voltage is not applied to any other systems, such as loads 40, 50 and battery 60, because they are disconnected due to the reduction in the generator (power output). A load dump in which at least one further system remains connected in addition to the generator electronics results in only a minor load on the diodes due to the load dump, which is accounted for as reduced load dump when the diodes are designed for maintaining the upper voltage limit in vehicle electrical system 100, i.e., a load dump is considered whose magnitude is less than that of a complete load dump. In this case, the DC voltage at B+ and B− does not exceed the maximum permissible voltage in vehicle electrical system 100 according to the present invention, because only a limited load dump has occurred.

The other action, namely allowing temporary operation of the diodes in the Zener breakdown even during normal generator operation, occurs, for example, when a low diode temperature is combined with a nominal Zener voltage of a diode at the lower edge of the Zener voltage tolerance range, and a generator output voltage is present at the upper edge of the permissible vehicle electrical system operating voltage range.

Figure 3:
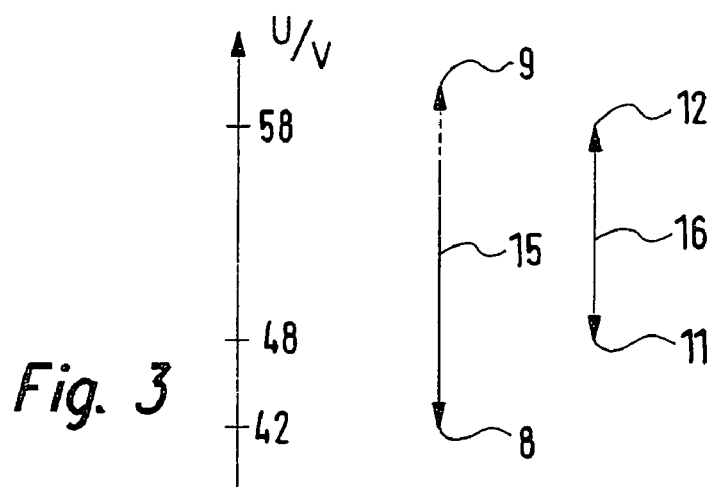
FIG. 3 shows an example of the tolerance range according to an exemplary embodiment of the present invention for rectifier diodes according to the present invention.

According to the exemplary embodiment of the present invention, therefore, a tolerance range is provided for the Zener voltage of Zener diodes 2–7, the tolerance range being identified in FIG. 3 by reference number 15. Reference number 8 identifies a lower limit of the Zener voltage of tolerance range 15, while reference number 9 designates an upper limit of the Zener voltage of tolerance range 15. FIG. 3 also shows a tolerance range 16, which provides the values at DC outputs B+, B− of rectifier 10 and may be applied to DC system 100. In this case, an upper DC voltage 12 of DC voltage range 16 and a lower DC voltage 11 of DC voltage range 12 are provided, upper DC voltage 12 representing the maximum voltage permitted in the vehicle electrical system during a load dump, while lower DC voltage 11 is the maximum voltage occurring during normal operation of the generator. Upper limit 9 of the Zener voltage may exceed preset upper DC voltage 12 when a load dump exceeds a certain magnitude, for example in the case of a "100% load dump" in the event of interruption of connection 90.

By way of example, FIG. 3 also shows a voltage scale, lower limit 8 of the Zener voltage being set to a voltage of 42 V, preset lower DC voltage 11 being set to a voltage of 48 V, preset upper DC voltage 12 being set to a voltage of 58 V and upper limit 9 of the Zener voltage being set to a voltage of 58 V or slightly higher. However, this should be viewed only as an exemplary embodiment.

According to the exemplary embodiment of the present invention, the manufacturing tolerance of the Zener voltage may remain largely unchanged compared to Zener diodes used in 14 V vehicle electrical systems. The Zener voltage rises only slightly due to the load dump reverse current and the diode overheating, compared to the Zener diode used in the 14 V system. The maximum Zener voltage in realistic load dumps relevant for vehicle electrical system components 40, 50, 60 does not exceed preset upper DC voltage 12. The lower tolerance ranges of Zener voltage range 15 overlap with the upper ranges of the permissible electrical system voltage during normal operation. In this case, the Zener diode is temporarily operated in the Zener breakdown. The result is an additional power loss in the diode. This causes the diode to heat up, while the Zener voltage continues to rise as a result of the positive temperature coefficient of the Zener voltage and current load in the diode, thereby also increasing the vehicle electrical system voltage to the maximum value required by preset lower DC voltage 11. This only slightly impairs the efficiency of generator 20 and does not limit the long-term reliability of the diode, despite the additional thermal load, due to its sturdy configuration.

What is claimed is:

1. A generator arrangement comprising:
    a generator;
    a diode system including:
        Zener diodes, wherein:
            the diode system includes AC voltage terminals connected to corresponding AC voltage terminals of the generator and DC voltage terminals connected to a DC system;
            the Zener diodes are operable in a forward direction to rectify an AC voltage present at the AC voltage terminals of the diode system, a lower limit being provided for a Zener voltage of the Zener diodes;
            the diode system is operable to generate a preset lower DC voltage;
            the lower limit of the Zener voltage is provided so as to be lower than the preset lower DC voltage;
            a portion of the Zener diodes are operated in a Zener mode, insofar as a DC voltage that largely exceeds the lower limit is present at the DC voltage terminals;
            the lower limit of the Zener voltage is set to approximately 42 V; and
            the preset lower DC voltage is set to approximately 48 V.

2. The generator arrangement of claim 1, wherein a preset upper DC voltage is a maximum applied to the DC system.

3. The generator arrangement of claim 2, wherein the preset upper DC voltage at the generator output is exceeded when the connection between the generator output and the rest of the DC system is interrupted.

4. A generator arrangement comprising:
a generator;
a diode system including:
  Zener diodes, wherein:
    the diode system includes AC voltage terminals connected to corresponding AC voltage terminals of the generator and DC voltage terminals connected to a DC system;
    the Zener diodes are operable in a forward direction to rectify an AC voltage present at the AC voltage terminals of the diode system, at least part of the Zener diodes being operated in a Zener mode for a sudden power drop, an upper limit being provided for the Zener voltage of the Zener diodes;
    the diode system is provided so as to generate a preset upper DC voltage;
    the preset upper DC voltage is set to approximately 58 V; and
    the upper limit of the Zener voltage exceeds the preset upper DC voltage if the sudden power drop exceeds a preset magnitude.

5. The generator arrangement of claim 4, wherein a preset upper DC voltage is a maximum applied to the DC system.

6. The generator arrangement of claim 5, wherein the preset upper DC voltage at the generator output is exceeded when the connection between the generator output and the rest of the DC system is interrupted.

* * * * *